US012573626B2

(12) United States Patent
You et al.

(10) Patent No.: US 12,573,626 B2
(45) Date of Patent: Mar. 10, 2026

(54) MATERIAL, PREPARATION METHOD THEREOF AND LITHIUM ION BATTERY

(71) Applicant: BYD COMPANY LIMITED, Shenzhen (CN)

(72) Inventors: Junfei You, Shenzhen (CN); Jinghua Chen, Shenzhen (CN); Chaqing Xu, Shenzhen (CN); Wenyu Cao, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 234 days.

(21) Appl. No.: 18/452,239

(22) Filed: Aug. 18, 2023

(65) Prior Publication Data

US 2023/0395797 A1 Dec. 7, 2023

Related U.S. Application Data

(62) Division of application No. 16/650,835, filed as application No. PCT/CN2018/107934 on Sep. 27, 2018, now Pat. No. 11,784,308.

(30) Foreign Application Priority Data

Sep. 28, 2017 (CN) .......................... 201710896969.5

(51) Int. Cl.
| | |
|---|---|
| *H01M 4/525* | (2010.01) |
| *C01G 53/40* | (2025.01) |
| *C01G 53/50* | (2025.01) |
| *H01M 4/02* | (2006.01) |
| *H01M 4/36* | (2006.01) |
| *H01M 4/505* | (2010.01) |
| *H01M 10/0525* | (2010.01) |

(52) U.S. Cl.
CPC ............ *H01M 4/525* (2013.01); *C01G 53/40* (2013.01); *C01G 53/50* (2013.01); *H01M 4/366* (2013.01);
(Continued)

(58) Field of Classification Search
CPC .............................. H01M 4/505; H01M 4/525
See application file for complete search history.

(56) References Cited

U.S. PATENT DOCUMENTS

2014/0227594 A1    8/2014  Song et al.
2016/0293950 A1*  10/2016  Kamata .................. C01G 53/50
(Continued)

FOREIGN PATENT DOCUMENTS

CN          102280619 A    12/2011
CN          103151511 A     6/2013
(Continued)

OTHER PUBLICATIONS

The World Intellectual Property Organization (WIPO) International Search Report for PCT/CN2018/107934 Dec. 26, 2018 5 Pages.
(Continued)

*Primary Examiner* — Nathanael T Zemui
(74) *Attorney, Agent, or Firm* — Wenye Tan

(57) ABSTRACT

The disclosure discloses a nickel cobalt lithium manganate cathode material, a preparation method thereof and a lithium ion battery. The nickel cobalt lithium manganate includes a core and an outer layer covering the outside of the core, the core comprises flaky particles, a D50 particle diameter of the flaky particles in the core is 5-10 μm, and a D50 particle diameter of particles in the outer layer is 0.1-4.5 μm.

19 Claims, 2 Drawing Sheets

(52) U.S. Cl.
CPC ....... *H01M 4/505* (2013.01); *H01M 10/0525*
(2013.01); *C01P 2002/54* (2013.01); *C01P*
*2004/03* (2013.01); *C01P 2004/20* (2013.01);
*C01P 2004/84* (2013.01); *C01P 2006/12*
(2013.01); *C01P 2006/40* (2013.01); *H01M*
*2004/021* (2013.01); *H01M 2004/028*
(2013.01)

(56) References Cited

U.S. PATENT DOCUMENTS

| | | | |
|---|---|---|---|
| 2016/0372749 A1 | 12/2016 | Iida et al. | |
| 2018/0048015 A1* | 2/2018 | Lee | H01M 10/058 |
| 2023/0317930 A1* | 10/2023 | Park | H01M 4/366 |
| | | | 429/223 |

FOREIGN PATENT DOCUMENTS

| | | | |
|---|---|---|---|
| CN | 103367704 | A | 10/2013 |
| CN | 103904318 | A | 7/2014 |
| CN | 105645455 | A | 6/2016 |
| CN | 106006762 | A | 10/2016 |
| CN | 106532035 | A | 3/2017 |
| CN | 107112515 | A | 8/2017 |
| JP | 2015026456 | A | 2/2015 |
| KR | 20160041663 | A | 4/2016 |
| KR | 20170081799 | A | 7/2017 |
| WO | 2016175597 | A1 | 11/2016 |

OTHER PUBLICATIONS

WO2016175597A1 Translation from Espacenet (Year 2016).

* cited by examiner

MATERIAL, PREPARATION METHOD THEREOF AND LITHIUM ION BATTERY

CROSS-REFERENCE TO RELATED APPLICATIONS

This application is a divisional application of U.S. patent application Ser. No. 16/650,835, filed Mar. 25, 2020, which is a national phase entry under 35 U.S.C. § 371 of International Application No. PCT/CN2018/107934, filed on Sep. 27, 2018, which claims a priority to and benefits of Chinese Patent Application Serial No. 201710896969.5, filed on Sep. 28, 2017, the entire content of all of which is incorporated herein by reference.

FIELD

The disclosure relates to the field of a lithium ion battery and, in particular, to a nickel cobalt lithium manganate cathode material, a preparation method thereof and a lithium ion battery.

BACKGROUND

An existing method for preparing the nickel cobalt manganese hydroxide, the nickel cobalt lithium manganate cathode material and a lithium ion battery comprises the following steps of: (1) mixing sulfates respectively comprising nickel, cobalt and manganese together to be dissolved into deionized water to form a sulfate water solution A; (2) dissolving sodium hydroxide powder into the deionized water to form a water solution B; (3) diluting ammonium hydroxide with the mass percentage being 25-28% to a certain concentration to obtain a diluted ammonium hydroxide solution C; (4) simultaneously dripping the water solution A in the step (1), the water solution B in the step (2) and the ammonium hydroxide solution C in the step (3) into a reaction kettle under the conditions of being protected by nitrogen gas, being stirred and being heated to 40-70° C., and after the reaction for a certain time, performing washing and drying to obtain nickel cobalt manganese hydroxide precursor powder; (5) weighing and taking, and uniformly mixing a lithium source compound and the nickel cobalt manganese hydroxide precursor material in the step (4), heating the materials to 600-1100° C. in air or oxygen gas atmosphere, performing continuous calcination for 8-20 h at 600-1100° C., and then cooling the materials to a room temperature to obtain a nickel cobalt lithium manganate finished product material; (6) making the nickel cobalt lithium manganate material obtained in the step (5) into a battery, but the lithium ion battery prepared from the prepared nickel cobalt manganese hydroxide and the nickel cobalt lithium manganate cathode material has poor rate capability and poor high-temperature storage performance of the battery.

Therefore, we are in need of the nickel cobalt manganese hydroxide and the nickel cobalt lithium manganate cathode material capable of obviously improving the rate capability and the high-temperature storage performance of the battery now.

SUMMARY

The disclosure aims at solving the problem of poor rate capability of a lithium ion battery in the prior art, and provides a nickel cobalt manganese hydroxide, a cathode material, a preparation method thereof and a lithium ion battery. The lithium ion battery prepared from the cathode material of the disclosure has high battery energy density and good battery rate capability.

In order to achieve the above goal, the disclosure provides the nickel cobalt manganese hydroxide in a first aspect. The nickel cobalt manganese hydroxide comprises a core and an outer layer covering the outside of the core, wherein the core comprises flaky particles, the $D_{50}$ particle diameter of the flaky particles in the core is 5-8 μm, and the $D_{50}$ particle diameter of particles in the outer layer is 0.1-5 μm.

The disclosure provides a method for preparing the nickel cobalt manganese hydroxide in a second aspect. The method comprises the following steps of mixing a water solution A comprising water-soluble nickel, cobalt and manganese ions with a water solution B comprising strong base, and ammonium hydroxide in inert atmosphere to take a complex-precipitation reaction, and then adding Ag powder to take a pulse current coprecipitation reaction.

The disclosure provides a nickel cobalt lithium manganate cathode material in a third aspect. The nickel cobalt lithium manganate is prepared by calcining a lithium source and the nickel cobalt manganese hydroxide or the nickel cobalt manganese hydroxide prepared by the above-mentioned method.

The disclosure provides a nickel cobalt lithium manganate cathode material in a fourth aspect. The nickel cobalt lithium manganate comprises a core and an outer layer covering the outside of the core, wherein the core comprises flaky particles, the $D_{50}$ particle diameter of the flaky particles in the core is 5-10 μm, and the $D_{50}$ particle diameter of particles in the outer layer is 0.1-4.5 μm.

The disclosure provides a method for preparing a cathode material in a fifth aspect. The method comprises the step of calcining the lithium source and the nickel cobalt manganese hydroxide or the nickel cobalt manganese hydroxide prepared by the above-mentioned method.

The disclosure provides a lithium ion battery in a sixth aspect, and the lithium ion battery comprises the cathode material or the cathode material prepared by the above-mentioned method.

Primary particles of the nickel cobalt manganese hydroxide prepared by the existing method are in compact distribution, so that the subsequently prepared nickel cobalt lithium manganate finished product material has poor rate capability although it has high energy density. In the disclosure, Ag powder is used as a conductive inducer, and a loose and porous nickel cobalt manganese hydroxide particle layer is formed on the existing compact nickel cobalt manganese hydroxide particle surfaces in a pulse current coprecipitation mode. The nickel cobalt manganese hydroxide particles prepared by this method have the compact inside and the loose and porous outside. Then the lithium source and the nickel cobalt manganese hydroxide are calcined, and are next cooled to the room temperature to obtain the nickel cobalt lithium manganate finished product material with the compact inside and the loose and porous outside. The specific surface area of the nickel cobalt lithium manganate finished product material is 0.1-10 m²/g, the $D_{50}$ particle diameter of the inside compact secondary particles (core flaky particles) is 5-10 and the $D_{50}$ particle diameter of outside loose particles (outer layer particles) is 0.1-4.5 The lithium ion battery prepared from the nickel cobalt lithium manganate finished product material as the cathode material simultaneously has excellent battery energy density and rate capability.

Other aspects and advantages of the present disclosure will be given in the following description, some of which will become apparent from the following description or may be learned from practices of the present disclosure.

BRIEF DESCRIPTION OF THE DRAWINGS

The accompanying drawings are provided to further understand the present disclosure, and they constitute a part of the application. The accompanying drawings, along with the detailed description below, are used to explain the present disclosure, and pose no limitation on the present disclosure.

DETAILED DESCRIPTION

Figure 1:
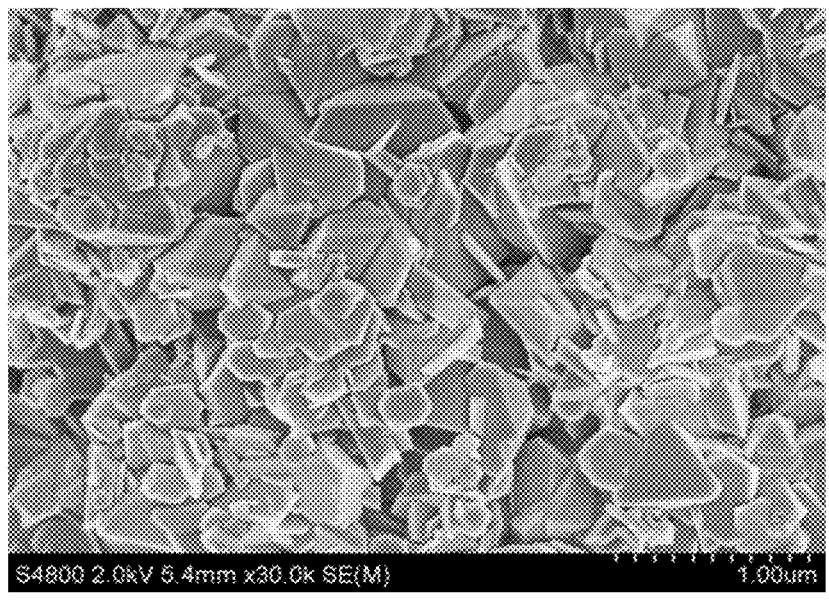
FIG. 1 is an SEM (scanning electron microscope) pattern (30000 times) of a nickel cobalt manganese hydroxide prepared according to an embodiment 1 of the disclosure.

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

In the description of the present disclosure, it should be understood that orientation or position relationships indicated by the terms such as "center", "vertical", "horizontal", "length", "width", "thickness", "above", "below", "front", "rear", "left", "right", "vertical", "horizontal", "top", "bottom", "inside", "outside", "clockwise", "counterclockwise", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In the descriptions of the present disclosure, unless explicitly specified, "multiple" means at least two, for example, two or three.

In the present disclosure, unless otherwise explicitly specified or defined, the first feature being located "above" or "below" the second feature may be the first feature being in a direct contact with the second feature, or the first feature being in an indirect contact with the second feature through an intermediary. In addition, the first feature being located "above" the second feature may be the first feature being located directly above or obliquely above the second feature, or may simply indicate that the first feature is higher in level than the second feature. The first feature being located "below" the second feature may be the first feature being located directly below or obliquely below the second feature, or may simply indicate that the first feature is lower in level than the second feature.

The endpoints and any values of the ranges disclosed herein are not limited to the precise range or value, and these ranges or values should be understood to include values close to these ranges or values. A numerical range between endpoint values of each range, a numerical range between an endpoint value and an individual point value of each range, and a numerical range between individual point values may be combined with each other to obtain one or more new numerical ranges, and such numerical ranges should be considered to be specifically disclosed herein.

The disclosure provides a nickel cobalt manganese hydroxide in a first aspect. The nickel cobalt manganese hydroxide comprises a core and an outer layer covering the outside of the core, wherein the core comprises flaky particles, the $D_{50}$ particle diameter of the flaky particles in the core is 5-8 μm, and the $D_{50}$ particle diameter of particles in the outer layer is 0.1-5 μm. It should be noted that the covering structure of the nickel cobalt manganese hydroxide is not a structure completely covering the core by the outer layer, and is a structure that small particles of the outer layer are attached onto the surfaces of flaky big particles of the core, gaps are loosely formed between the small particles of the outer layer, and a loose and porous outer layer is formed.

According to the nickel cobalt manganese hydroxide of the disclosure, the porosity of the core is 30-51%, and the porosity of the outer layer is 52-60%. Namely, the particles of the nickel cobalt manganese hydroxide of the disclosure have a compact inside and a loose and porous outside. Then a lithium source and the nickel cobalt manganese hydroxide are calcined, and are next cooled to the room temperature to obtain a nickel cobalt lithium manganate finished product material with the compact inside and the loose and porous outside.

In the disclosure, the core porosity refers to the porosity by using the total volume of the core as the reference, and the outer layer porosity refers to the porosity by using the total volume of the outer layer as the reference.

The nickel cobalt manganese hydroxide of the disclosure preferably has a chemical formula of $Ni_xCo_yMn_{1-x-y}(OH)_2$, wherein $0<x<1$, $0<y<1$, and $0<1-x-y<1$, so that the rate capability of the lithium ion battery prepared from the nickel cobalt lithium manganate cathode material can be obviously improved.

For the nickel cobalt manganese hydroxide of the disclosure, preferably, the $D_{50}$ particle diameter of the flaky particles in the core is 5-7.5 μm, and the $D_{50}$ particle diameter of the particles in the outer layer is 0.1-4.5 so that the rate capability of the lithium ion battery prepared from the nickel cobalt lithium manganate cathode material can be obviously improved.

The nickel cobalt manganese hydroxide of the disclosure preferably comprises Ag, and preferably, the content of the Ag in the nickel cobalt manganese hydroxide is lower than 20 ppm (preferably lower than 10 ppm), so that the influence on the subsequent performance of the lithium ion battery by too high Ag content can be avoided. It should be noted that the existence form of the Ag in the nickel cobalt manganese hydroxide is not specially limited, and the Ag can exist in a simple substance form, and can also exist in a compound form.

The nickel cobalt manganese hydroxide of the disclosure preferably has the specific surface area of 0.1-10 m²/g, more preferably 5-8 m²/g, so that the rate capability of the finally prepared lithium ion battery can be excellent.

The disclosure provides a method for preparing nickel cobalt manganese hydroxide in a second aspect. The method comprisoffing: mixing a water solution A comprising water-soluble nickel, cobalt and manganese ions a water solution B comprising strong base, and ammonium in inert atmosphere to make a complex-precipitation reaction, and then adding Ag powder in it to make a pulse current coprecipitation reaction.

In the disclosure, the pulse current coprecipitation reaction refers to a coprecipitation reaction performed under the condition of pulse current.

According to the method of the disclosure, a method for preparing the water solution A comprising water-soluble nickel, cobalt and manganese ions can comprise the step of dissolving water-soluble nickel salts, water-soluble cobalt salts and water-soluble manganese salts into water. In the disclosure, the water-soluble nickel salts can be various kinds of water-soluble nickel salts in the art, such as at least one kind of nickel salts from nickel sulfate, nickel nitrate and nickel chloride, preferably nickel sulfate. The water-soluble cobalt salts can be various water-soluble cobalt salts in the art, such as at least one kind of cobalt salts from cobalt sulfate, cobalt nitrate and cobalt chloride, preferably cobalt sulfate. The water-soluble manganese salts can be various water-soluble manganese salts in the art, such as at least one kind of manganese salts from manganese sulfate, manganese nitrate and manganese chloride, preferably manganese sulfate.

According to the method of the disclosure, preferably, the mol ratio of element Ni:Co:Mn in the water solution A is x:y:(1-x-y), wherein $0<x<1$, $0<y<1$, and $0<1-x-y<1$, so that the chemical formula of the prepared nickel cobalt manganese hydroxide is $Ni_xCo_yMn_{1-x-y}(OH)_2$, wherein $0<x<1$, $0<y<1$, $0<1-x-y<1$, and the rate capability of the lithium ion battery prepared from the nickel cobalt lithium manganate cathode material is obviously improved.

According to the method of the disclosure, the concentration of the water-soluble nickel, cobalt and manganese ions in the water solution A is 0.1-3 mol/L, and preferably 0.1-2 mol/L. Herein, the concentration of the water-soluble nickel, cobalt and manganese ions refers to the total concentration of three kinds of elements of nickel, cobalt and manganese in the salt.

According to the method of the disclosure, the concentration of ammonium hydroxide can be 0.1-1.6 mol/L, preferably 0.1-1.2 mol/L. The ammonium hydroxide with the required concentration of the disclosure can be obtained by diluting ammonium hydroxide with the concentration being 25-28%.

According to the method of the disclosure, the strong base can be various kinds of strong base in the art, such as sodium hydroxide and/or potassium hydroxide. In the disclosure, the concentration of the strong base in the water solution B can be 0.1-16 mol/L, preferably 0.1-10 mol/L.

The strong base of the disclosure is a precipitating agent of the complex-precipitation reaction, and the ammonium hydroxide is a complexing agent of the complex-precipitation reaction. Therefore, the consumption of the strong base and the ammonium hydroxide in the disclosure only needs to enable the full complex-precipitation of the nickel ions, cobalt ions and manganese ions in the water solution A to form nickel cobalt manganese hydroxide, and namely, the consumption of the strong base and the ammonium hydroxide only needs to be excessive relative to the water-soluble nickel cobalt manganese salts.

The method of the disclosure preferably comprises the step of preparing a nickel, cobalt and manganese sulfate solution (water solution A) from $CoSO_4 \cdot 7H_2O$, $NiSO_4 \cdot 6H_2O$ and $MnSO_4 \cdot H_2O$, wherein in order to enable the cobalt, nickel and manganese ions in the solution to form the nickel cobalt manganese hydroxide, relative to 40 L of nickel, cobalt and manganese sulfate solution with the concentration of 0.1-2 mol/L, the consumption of the ammonium hydroxide with the concentration of 0.1-1.2 molL⁻¹ is 0.1-40 L, and the consumption of the NaOH water solution (water solution B) with the concentration of 0.1-10 molL⁻¹ is 0.1-40 L.

In order to more uniformly prepare the nickel cobalt manganese hydroxide, the method of the disclosure preferably comprises the step of simultaneously dripping the water solution A, the ammonium hydroxide and the water solution B into a reaction vessel under the stirring condition, wherein the dripping speed can be 0.2-2 L/h, and the stirring speed can be 4-10 ms⁻¹.

According to the method of the disclosure, the conditions of the complex-precipitation reaction can be various complex-precipitation reaction conditions in the art, for example, the conditions may comprise the temperature being 40-70° C., preferably 40-60° C., and the time being 0.1-80 h, preferably 0.1-60 h (more preferably 0.1-20 h), so that the whole particle diameter distribution of the nickel cobalt manganese hydroxide can be controlled.

According to the method of the disclosure, a mode for taking the pulse current coprecipitation reaction comprises the steps of inserting a metal electrode into the reaction vessel, forming an electrolytic tank between the metal electrode and the metal reaction vessel, then adding Ag powder into the reaction vessel, and next introducing a pulse power supply, wherein the metal electrode can be at least one kind of electrodes from a Pt electrode, an Au electrode and an Ag electrode, preferably the Pt electrode, and the reaction vessel can be various conventional reaction vessels in the art.

According to the method of the disclosure, preferably, the conditions of the pulse current coprecipitation reaction comprise the pulse ratio being 1:(1-10), more preferably 1:(1-5), and the reaction time being 0.1-40 h, more preferably 0.1-30 h, so that the porosity, the particle diameter distribution and the like of the core and the outer layer of the prepared nickel cobalt manganese hydroxide can be further controlled, and the rate capability of the lithium ion battery prepared from the nickel cobalt lithium manganate cathode material can be obviously improved. In the disclosure, a pulse power supply being 0-32 V can be used for providing the preferable pulse ratio.

According to the method of the disclosure, relative to 1566 g of element Ni, the consumption of Ag powder is preferably 0.36-1 g, more preferably 0.36-0.6 g, the porosity, the particle diameter distribution and the like of the core and the outer layer of the prepared nickel cobalt manganese hydroxide can be further controlled, and the rate capability of the lithium ion battery prepared from the nickel cobalt lithium manganate cathode material can be obviously improved.

The method of the disclosure can also comprise the steps of washing and drying slurry obtained through the pulse current coprecipitation reaction and obtaining the nickel cobalt manganese hydroxide, wherein the washing times can be 3-7 times, and the drying temperature can be 100-120° C.

In the disclosure, inert atmosphere can be provided by nitrogen gas and/or inert gas, wherein the inert gas can be He, Ne, Ar, Kr or Xe.

The disclosure provides a nickel cobalt lithium manganate cathode material in a third aspect. The nickel cobalt lithium manganate is prepared by calcining the lithium source and the nickel cobalt manganese hydroxide or the nickel cobalt manganese hydroxide prepared by the above-mentioned method.

The disclosure provides a nickel cobalt lithium manganate cathode material in a fourth aspect. The nickel cobalt lithium manganate in the nickel cobalt lithium manganate cathode material comprises a core and an outer layer covering the outside of the inner core. The core comprises flaky particles, the $D_{50}$ particle diameter of the flaky particles in the core is 5-10 µm, and the $D_{50}$ particle diameter of particles in the outer layer is 0.1-4.5 µm, so that the rate capability of the lithium ion battery prepared from the nickel cobalt lithium manganate cathode material is improved.

According to the nickel cobalt lithium manganate cathode material of the disclosure, preferably, the core porosity is 8-15%, and the outer layer porosity is 20-40%. Namely, the nickel cobalt lithium manganate of the disclosure has the compact inside and the loose and porous outside.

According to the nickel cobalt lithium manganate cathode material of the disclosure, preferably, the $D_{50}$ particle diameter of the flaky particles in the core is 7-10 µm, and the $D_{50}$ particle diameter of particles in the outer layer is 0.9-2.5 µm, so that the rate capability of the lithium ion battery prepared from the nickel cobalt lithium manganate cathode material is obviously improved.

According to the nickel cobalt lithium manganate cathode material of the disclosure, preferably, the chemical formula of the nickel cobalt lithium manganate is $LiNi_xCo_yMn_{1-x-y}O_2$, wherein 0<x<1, 0<y<1, and 0<1-x-y<1, so that the rate capability of the lithium ion battery prepared from the nickel cobalt lithium manganate cathode material is obviously improved.

According to the nickel cobalt lithium manganate cathode material of the disclosure, preferably, the content of Ag in the cathode material is lower than 20 ppm (preferably lower than 10 ppm), so that the influence on the subsequent lithium ion battery performance by too high Ag content can be avoided.

The nickel cobalt lithium manganate cathode material of the disclosure has the specific surface area being preferably 0.1-10 m²/g, more preferably 0.5-1.5 m²/g, so that the rate capability of the finally prepared lithium ion battery can be excellent.

The disclosure provides a method for preparing the cathode material in a fifth aspect. The method comprises the step of calcining the lithium source with the nickel cobalt manganese hydroxide or the nickel cobalt manganese hydroxide prepared by the above-mentioned method.

The method of the disclosure can further comprise the steps of uniformly mixing the lithium source with the prepared nickel cobalt manganese hydroxide and then performing calcination.

According to the method of the disclosure, the lithium source can be various lithium-containing compounds capable of being used for the lithium ion battery in the art, and for example, can be lithium carbonate and/or lithium hydroxide.

According to the method of the disclosure, preferably, the mol ratio of the element Li to the nickel cobalt manganese hydroxide is (1.0-1.1):1, more preferably (1.0-1.08):1, so that the chemical formula of the prepared nickel cobalt lithium manganate is $LiNi_xCo_yMn_{1-x-y}O_2$, wherein 0<x<1, 0<y<1, and 0<1-x-y<1.

According to the method of the disclosure, the calcination conditions can be various calcination conditions in the art, and for example, can include the temperature being 600-1100° C., preferably 750-950° C., and the time being 8-20 h, preferably 10-15 h. In the disclosure, the calcination oxidization environment can be provided by air and/or oxygen gas, and for example, can be realized through introducing air and/or oxygen gas into the muffle furnace.

The disclosure provides a lithium ion battery in a sixth aspect. The lithium ion battery comprises the cathode material or the cathode material prepared by the above-mentioned method.

The preparation method of the lithium ion battery of the disclosure can be various conventional preparation methods of the lithium ion battery in the art, and for example, can comprise the steps of: i. plugging two layers of foamed nickel in an anode case, and putting the anode case and a cathode case into a baking oven to be baked for 30-40 min; ii. transferring a cathode plate (including the prepared cathode material) and the cathode case and the anode case taken out from the baking oven into a glove box, and starting the assembly from an anode; iii. putting the anode case onto filter paper, taking out a lithium plate, putting the lithium plate onto the foamed nickel in the anode case, and flatly clamping the lithium plate by a clamp; iv. putting the cathode case onto the filter paper, putting in the pressed cathode plate, putting the cathode plate in the right center position of the cathode case, ensuring slight taking and slight putting during the putting-in to avoid material falling from the cathode plate, and infusing a proper amount of electrolyte, v. adding a layer of diaphragm paper, wherein during the diaphragm paper addition, one end of the diaphragm paper is firstly soaked with the electrolyte, and then the other end is slowly put down so that the diaphragm paper is completely soaked with the electrolyte without bubbles in the middle; vi. infusing a proper amount of electrolyte, covering the anode case, and after the flat putting, slightly exerting pressure to press down the anode case and to sleeve the anode case into the cathode case; and vii. taking out the battery, sealing the opening in a way of maintaining the constant pressure and static pressure of each battery to the greatest extent, and cleanly wiping the electrolyte on the surface of the battery after the opening sealing.

The energy density of the lithium ion battery of the disclosure is as high as 1.5-2.5 Wh/cm³, and the rate capability 5 C/0.2 C is as high as 90-99%.

The disclosure will be illustrated in detail hereafter through embodiments.

The SEM is an S4800 scanning electron microscope produced by Hitachi (Japanese company), and has the test voltage of 5 KV.

A preparation method of the lithium ion battery comprises the steps of: i. plugging two layers of foamed nickel in the anode case, and putting the anode case and the cathode case into the baking oven to be baked for 30 min; ii. transferring the cathode plate (including the prepared cathode material) and the cathode case and the anode case taken out from the baking oven into the glove box, and starting the assembly from the anode; iii. putting the anode case onto the filter paper, taking out the lithium plate, putting the lithium plate onto the foamed nickel in the anode case, and flatly clamping the lithium plate by the clamp; iv. putting the cathode case onto the filter paper, putting in the pressed cathode plate, putting the cathode plate in the right center position of the cathode case, ensuring slight taking and slight putting during the putting-in to avoid material falling from the cathode plate, and infusing a proper amount of electrolyte;

v. adding one layer of Φ16 diaphragm paper, wherein during the diaphragm paper addition, one end of the diaphragm paper is firstly soaked with the electrolyte, and then the other end is slowly put down so that the diaphragm paper is completely soaked with the electrolyte without bubbles in the middle; vi. infusing a proper amount of electrolyte, covering the anode case, and after the flat putting, slightly exerting pressure to press down the anode case and to sleeve the anode case into the cathode case; and vii. taking out the battery, sealing the opening in a way of maintaining the constant pressure and static pressure of each battery to the greatest extent, and cleanly wiping the electrolyte on the surface of the battery after the opening sealing.

The disclosure will be further illustrated hereafter through embodiments, but is not limited thereto.

Embodiment 1

The embodiment is used for illustrating the nickel cobalt manganese hydroxide, the cathode material, the preparation method thereof and the lithium ion battery of the disclosure.

Figure 2:
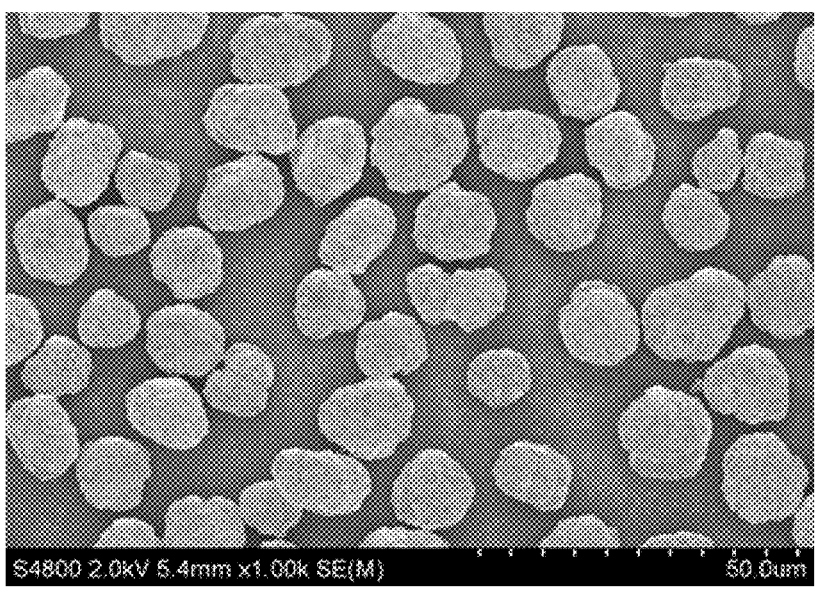
FIG. 2 is an SEM pattern (1000 times) of the nickel cobalt manganese hydroxide prepared according to the embodiment 1 of the disclosure.

(1) 7.495 kg of $CoSO_4 \cdot 7H_2O$, 7.009 kg of $NiSO_4 \cdot 6H_2O$ and 4.507 kg of $MnSO_4 \cdot H_2O$ are dissolved into deionized water to be prepared into 40 L of 2.0 $molL^{-1}$ nickel, cobalt and manganese sulfate solution; 6.4 kg of NaOH is dissolved into the deionized water to be prepared into 40 L of 4.0 $molL^{-1}$ sodium hydroxide solution; 1.632 kg of ammonium hydroxide with the mass percentage being 25% is dissolved into the deionized water to be prepared into 40 L of 0.6 $molL^{-1}$ ammonium hydroxide solution; a stirring paddle is started at the speed of 5 $ms^{-1}$; then the nickel, cobalt and manganese sulfate solution, the sodium hydroxide solution and the ammonium hydroxide solution are simultaneously dripped into a reaction kettle (at the dripping speed of 0.2 L/h) in nitrogen gas atmosphere to take a complex-precipitation reaction; the reaction is continuously performed for 40 h; then a Pt electrode is inserted into the reaction kettle to form an electrolytic tank with stainless steel of the reaction kettle; 0.3 g of Ag powder is added into the reaction kettle; a 32 V pulse power supply is switched on; the pulse ratio is 1:1; the pulse current coprecipitation reaction is continuously performed for 30 h; prepared slurry is washed for 5 times; drying is performed at 100° C.; and nickel cobalt manganese hydroxide powder A1 with a core and an outer layer covering the outside of the core is obtained. The chemical formula of the nickel cobalt manganese hydroxide powder A1 is $Ni_{1/3}Co_{1/3}Mn_{1/3}(OH)_2$. FIG. 1 is an SEM pattern (30000 times) of the nickel cobalt manganese hydroxide powder A1. FIG. 2 is an SEM pattern (1000 times) of the nickel cobalt manganese hydroxide powder A1.

(2) 0.37 kg of lithium carbonate and 0.915 kg of nickel cobalt manganese hydroxide powder prepared in the step (1) are weighed and taken, and uniformly mixed by a high-speed material mixing machine according to a mol ratio of the lithium source (metered by the element Li) and the nickel cobalt manganese hydroxide powder being 1:1. The air is introduced into a muffle furnace to heat the material to 950° C. Constant temperature sintering is performed for 12 h, then the material is cooled to the room temperature, a nickel cobalt lithium manganate finished product material B1 with a core and an outer layer covering the outside of the core is obtained, and the chemical formula is $LiNi_{1/3}Co_{1/3}Mn_{1/3}O_2$.

(3) The nickel cobalt lithium manganate finished product material B1 prepared in the step (2) is used for preparing a lithium ion battery C1.

Embodiment 2

The embodiment is used for illustrating the nickel cobalt manganese hydroxide, the cathode material, the preparation method thereof and the lithium ion battery of the disclosure.

(1) 7.495 kg of $CoSO_4 \cdot 7H_2O$, 7.009 kg of $NiSO_4 \cdot 6H_2O$ and 4.507 kg of $MnSO_4 \cdot H_2O$ are dissolved into deionized water to be prepared into 40 L of 2.0 $molL^{-1}$ nickel, cobalt and manganese sulfate solution; 16 kg of NaOH is dissolved into deionized water to be prepared into 40 L of 10 $molL^{-1}$ sodium hydroxide solution; 3.264 kg of ammonium hydroxide with the mass percentage being 25% is dissolved into the deionized water to be prepared into 40 L of 1.2 $molL^{-1}$ ammonium hydroxide solution; the stirring paddle is started at the speed of 4 $ms^{-1}$; then the nickel, cobalt and manganese sulfate solution, the sodium hydroxide solution and the ammonium hydroxide solution are simultaneously dripped into a reaction kettle (at the dripping speed of 2 L/h) in nitrogen gas atmosphere to take a complex-precipitation reaction; the reaction is continuously performed for 40 h; then a Pt electrode is inserted into the reaction kettle to form an electrolytic tank with stainless steel of the reaction kettle; 0.5 g of Ag powder is added into the reaction kettle; a 32 V pulse power supply is switched on; the pulse ratio is 1:3; the pulse current coprecipitation reaction is continuously performed for 5 h; prepared slurry is washed for 5 times; drying is performed at 110° C.; and nickel cobalt manganese hydroxide powder A2 with a core and an outer layer covering the outside of the core is obtained. The chemical formula of the nickel cobalt manganese hydroxide powder A2 is $Ni_{1/3}Co_{1/3}Mn_{1/3}(OH)_2$.

(2) 0.37 kg of lithium carbonate and 0.915 kg of nickel cobalt manganese hydroxide powder prepared in the step (1) are weighed and taken, and uniformly mixed by a high-speed material mixing machine according to a mol ratio of the lithium source (metered by the element Li) and the nickel cobalt manganese hydroxide powder being 1:1. The air is introduced into the muffle furnace to heat the material to 750° C. Constant temperature sintering is performed for 20 h, then the material is cooled to the room temperature, a nickel cobalt lithium manganate finished product material B2 with a core and an outer layer covering the outside of the core is obtained, and the chemical formula is $LiNi_{1/3}Co_{1/3}Mn_{1/3}O_2$.

(3) The nickel cobalt lithium manganate finished product material B2 prepared in the step (2) is used for preparing a lithium ion battery C2.

Embodiment 3

The embodiment is used for illustrating the nickel cobalt manganese hydroxide, the cathode material, the preparation method thereof and the lithium ion battery of the disclosure.

(1) 7.495 kg of $CoSO_4 \cdot 7H_2O$, 7.009 kg of $NiSO_4 \cdot 6H_2O$ and 4.507 kg of $MnSO_4 \cdot H_2O$ are dissolved into deionized water to be prepared into 40 L of 2.0 $molL^{-1}$ nickel, cobalt and manganese sulfate solution; 6.4 kg of NaOH is dissolved into deionized water to be prepared into 40 L of 4.0 $molL^{-1}$ sodium hydroxide solution; 1.632 kg of ammonium hydroxide with the mass percentage being 25% is dissolved into the deionized water to be prepared into 40 L of 0.6 $molL^{-1}$ ammonium hydroxide solution; the stirring paddle is started at the speed of 3 $ms^{-1}$; then the nickel, cobalt and manganese sulfate solution, the sodium hydroxide solution and the ammonium hydroxide solution are simultaneously dripped into a reaction kettle (at the dripping speed of 1 L/h) in nitrogen gas atmosphere to take a complex-precipitation reaction; the reaction is continuously performed for 40 h; then a Pt electrode is inserted into the reaction kettle to form an electrolytic tank with stainless steel of the reaction kettle; 0.6 g of Ag powder is added into the reaction kettle; a 32 V pulse power supply is switched on; the pulse ratio is 1:5; the pulse current coprecipitation reaction is continuously performed for 1 h; prepared slurry is washed for 5 times; drying is performed at 120° C.; and nickel cobalt manganese hydroxide powder A3 with a core and an outer layer covering the outside of the core is obtained. The chemical formula of the nickel cobalt manganese hydroxide powder A3 is $Ni_{1/3}Co_{1/3}Mn_{1/3}(OH)_2$.

(2) 0.37 kg of lithium carbonate and 0.915 kg of nickel cobalt manganese hydroxide powder prepared in the step (1) are weighed and taken, and uniformly mixed by a high-speed material mixing machine according to a mol ratio of the lithium source (metered by the element Li) and the nickel cobalt manganese hydroxide powder being 1:1. The air is introduced into the muffle furnace to heat the material to 800° C. Constant temperature sintering is performed for 20 h, then the material is cooled to the room temperature, a nickel cobalt lithium manganate finished product material B3 with a core and an outer layer covering the outside of the core is obtained, and the chemical formula is $LiNi_{1/3}Co_{1/3}Mn_{1/3}O_2$.

(3) The nickel cobalt lithium manganate finished product material B3 prepared in the step (2) is used for preparing a lithium ion battery C3.

Embodiment 4

The embodiment is used for illustrating the nickel cobalt manganese hydroxide, the cathode material, the preparation method thereof and the lithium ion battery of the disclosure.

(1) 7.495 kg of $CoSO_4 \cdot 7H_2O$, 7.009 kg of $NiSO_4 \cdot 6H_2O$ and 4.507 kg of $MnSO_4 \cdot H_2O$ are dissolved into deionized water to be prepared into 40 L of 2.0 $molL^{-1}$ nickel, cobalt and manganese sulfate solution; 8.98 kg of KOH is dissolved into the deionized water to be prepared into 40 L of 4.0 $molL^{-1}$ potassium hydroxide solution; 1.632 kg of ammonium hydroxide with the mass percentage being 25% is dissolved into the deionized water to be prepared into 40 L of 0.6 $molL^{-1}$ ammonium hydroxide solution; the stirring paddle is started at the speed of 3 $ms^{-1}$; then the nickel, cobalt and manganese sulfate solution, the potassium hydroxide solution and the ammonium hydroxide solution are simultaneously dripped into a reaction kettle (at the dripping speed of 0.2 L/h) in nitrogen gas atmosphere to take a complex-precipitation reaction; the reaction is continuously performed for 40 h; then a Pt electrode is inserted into the reaction kettle to form an electrolytic tank with stainless steel of the reaction kettle; 0.3 g of Ag powder is added into the reaction kettle; a 32 V pulse power supply is switched on; the pulse ratio is 1:1; the pulse current coprecipitation reaction is continuously performed for 15 h; prepared slurry is washed for 5 times; drying is performed at 100° C.; and nickel cobalt manganese hydroxide powder A4 with a core and an outer layer covering the outside of the core is obtained. The chemical formula of the nickel cobalt manganese hydroxide powder A4 is $Ni_{1/3}Co_{1/3}Mn_{1/3}(OH)_2$.

(2) 0.026 kg of lithium carbonate and 0.915 kg of nickel cobalt manganese hydroxide powder prepared in the step (1) are weighed an taken, and uniformly mixed by a high-speed material mixing machine according to a mol ratio of the lithium source (metered by the element Li) and the nickel cobalt manganese hydroxide powder being 1.08:1. The air is introduced into the muffle furnace to heat the material to 950° C. Constant temperature sintering is performed for 12 h, then the material is cooled to the room temperature, a nickel cobalt lithium manganate finished product material B4 with a core and an outer layer covering the outside of the core is obtained, and the chemical formula is $LiNi_{1/3}Co_{1/3}Mn_{1/3}O_2$.

(3) The nickel cobalt lithium manganate finished product material B4 prepared in the step (2) is used for preparing a lithium ion battery C4.

Embodiment 5

The embodiment is used for illustrating the nickel cobalt manganese hydroxide, the cathode material, the preparation method thereof and the lithium ion battery of the disclosure.

A nickel cobalt manganese hydroxide A5, a cathode material B5 and a lithium ion battery C5 are prepared by the method according to the embodiment 1. The difference is that relative to 1566.0 g of element Ni, the consumption of Ag powder is 1.0 g.

Embodiment 6

The embodiment is used for illustrating the nickel cobalt manganese hydroxide, the cathode material, the preparation method thereof and the lithium ion battery of the disclosure.

A nickel cobalt manganese hydroxide A6, a cathode material B6 and a lithium ion battery C6 are prepared by the method according to the embodiment 1. The difference is that relative to 1566.0 g of element Ni, the consumption of Ag powder is 0.8 g.

Embodiment 7

The embodiment is used for illustrating the nickel cobalt manganese hydroxide, the cathode material, the preparation method thereof and the lithium ion battery of the disclosure.

A nickel cobalt manganese hydroxide A7, a cathode material B7 and a lithium ion battery C7 are prepared by the method according to the embodiment 1. The difference is that the pulse ratio of the pulse current coprecipitation reaction is 6:1, and the reaction time is 10 h.

Embodiment 8

The embodiment is used for illustrating the nickel cobalt manganese hydroxide, the cathode material, the preparation method thereof and the lithium ion battery of the disclosure.

A nickel cobalt manganese hydroxide A8, a cathode material B8 and a lithium ion battery C8 are prepared by the method according to the embodiment 1. The difference is that the pulse ratio of the pulse current coprecipitation reaction is 1:20, and the reaction time is 10 h.

Embodiment 9

The embodiment is used for illustrating the nickel cobalt manganese hydroxide, the cathode material, the preparation method thereof and the lithium ion battery of the disclosure.

A nickel cobalt manganese hydroxide A10, a cathode material B10 and a lithium ion battery C10 are prepared by the method according to the embodiment 1. The difference is that the temperature of the complex-precipitation reaction is 90° C., and the time is 40 h.

Contrast Embodiment 1

A nickel cobalt manganese hydroxide D1, a cathode material DS1 and a lithium ion battery DSS1 are prepared by

13

Figure 3:
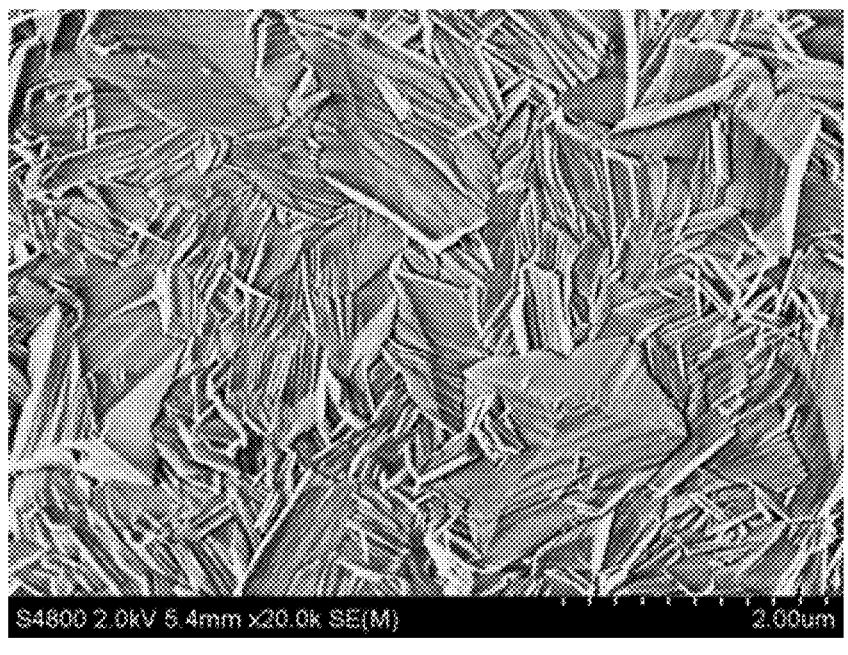
FIG. 3 is an SEM pattern (20000 times) of a nickel cobalt manganese hydroxide prepared according to a contrast embodiment 1 of the disclosure.
Figure 4:
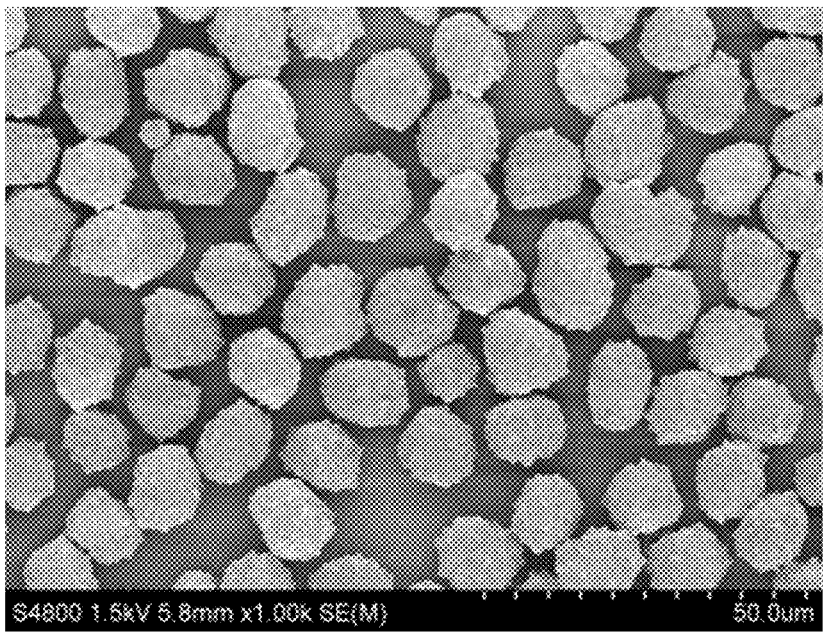
FIG. 4 is an SEM pattern (1000 times) of the nickel cobalt manganese hydroxide prepared according to the contrast embodiment 1 of the disclosure.

14 the method according to embodiment 1. The difference is that the nickel cobalt manganese hydroxide obtained through the complex-precipitation reaction is directly washed and dried, pulse current coprecipitation reaction is not performed, FIG. 3 is an SEM pattern (20000 times) of nickel cobalt manganese hydroxide D1 powder, and FIG. 4 is an SEM pattern (1000 times) of the nickel cobalt manganese hydroxide D1 powder.

Test Embodiment

1. The nickel cobalt manganese hydroxide powder A1-A9 and D1 and nickel cobalt lithium manganate cathode materials B1-B9 and DS1 are observed by the SEM to obtain the SEM pattern. Then through SEM software, the particle diameter distribution of the flaky particles in the core of the nickel cobalt manganese hydroxide powder and the particle diameter distribution of the particles in the outer layer are obtained (test method: the powder is subjected to ion grinding by an ion grinding instrument to obtain powder cross section. Then the SEM is used for observing the powder cross section to obtain the cross section SEM pattern, the cross section SEM pattern is measured, the diameter average value of a core flaky particle region, i.e., the $D_{50}$ of the flaky particles of the core is counted and measured, and the thickness average value of an outer layer particle region, i.e., the $D_{50}$ of the particles of the outer layer is counted and measured). The specific results are shown in Table 1.

i.e. the outer layer porosity is counted and measured). The specific results are shown in Table 1.

3. The Ag content of the nickel cobalt manganese hydroxide powder A1-A9 and D1 and the nickel cobalt lithium manganate cathode materials B1-B9 and DS1 is measured by an inductively coupled plasma spectrometer, and the measured results are shown in Table 1.

4. The specific surface area of the nickel cobalt manganese hydroxide powder A1-A9 and D1 and the nickel cobalt lithium manganate cathode materials B1-B9 and DS1 is measured by using a specific surface area test instrument, and the measured results are shown in Table 1.

5. The battery energy density of the lithium ion batteries C1-C9 and DSS1 is calculated according to a following formula 1, the rate capability 5 C/0.2 C of the lithium ion batteries C1-C9 and DSS1 is calculated according to a following formula 2, and the measured results are shown in Table 2.

Formula 1: battery energy density=UIt/g*powder compression density (wherein the U is the material charging average voltage, the I is charging and discharging current, the t is the charging and discharging time, and the unit of the powder compaction density is g/cm³), and the unit of the battery energy density is Wh/cm³.

Formula 2: battery rate capability 5 C/0.2 C=5*material rated capacity/0.2*material rated capacity (wherein the material rated capacity refers to the theoretical capacity of the material per se).

TABLE 1

| | Nickel cobalt manganese hydroxide | | | | | | Nickel cobalt lithium manganate | | | | | |
|---|---|---|---|---|---|---|---|---|---|---|---|---|
| Serial number | $D_{50}$ particle diameter of core flaky particles (μm) | Core porosity (%) | $D_{50}$ particle diameter of outer layer particles (μm) | Outer layer porosity (%) | Specific surface area (m²/g) | Ag content (ppm) | $D_{50}$ particle diameter of core flaky particles (μm) | Core porosity (%) | $D_{50}$ particle diameter of outer layer particles (μm) | Outer layer porosity (%) | Specific surface area (m²/g) | Ag content (ppm) |
| Embodiment 1 | 7.1 | 35 | 0.5 | 58 | 6.5 | 2.5 | 8.0 | 10 | 1.4 | 28 | 0.8 | 2.4 |
| Embodiment 2 | 7.0 | 34 | 0.5 | 52 | 6.3 | 5.1 | 7.7 | 8 | 1.4 | 22 | 0.6 | 4.7 |
| Embodiment 3 | 7.2 | 36 | 0.9 | 57 | 6.6 | 7.7 | 8.1 | 11 | 1.8 | 29 | 0.9 | 7.2 |
| Embodiment 4 | 7.0 | 35 | 1.4 | 53 | 6.5 | 2.6 | 8.2 | 10 | 2.4 | 23 | 0.7 | 2.5 |
| Embodiment 5 | 7.1 | 38 | 0.6 | 55 | 6.5 | 8.5 | 8.0 | 12 | 1.6 | 26 | 0.8 | 8.5 |
| Embodiment 6 | 7.1 | 40 | 0.6 | 55 | 6.5 | 8 | 8.0 | 14 | 1.5 | 26 | 0.8 | 8 |
| Embodiment 7 | 7.1 | 36 | 1.26 | 54 | 5.3 | 2.5 | 8.0 | 12 | 2.21 | 20 | 0.5 | 2.4 |
| Embodiment 8 | 7.1 | 38 | 0.1 | 54 | 7.5 | 2.5 | 8.0 | 15 | 0.9 | 35 | 1.3 | 2.4 |
| Embodiment 9 | 9 | 51 | 0.5 | 55 | 6.5 | 2.5 | 10.1 | 13 | 1.4 | 26 | 0.8 | 2.4 |
| Contrast embodiment 1 | 4.8 | 25 | — | — | 5.0 | 0 | 8.0 | 10 | — | — | 0.4 | 0 |

2. The porosities of the core and the outer layer of the nickel cobalt manganese hydroxide powder A1-A9 and D1 and the nickel cobalt lithium manganate cathode materials B1-B9 and DS1 are measured (test method: the powder is subjected to ion grounding by the ion grinding instrument to obtain powder cross section. Then the SEM is used for observing the powder cross section to obtain the cross section SEM pattern, the cross section SEM pattern is measured, the ratio of pore area of the core flaky particle region/the total area of the core, i.e. the core porosity is counted and measured, and the ratio of the pore area of the outer layer particle region/the total area of the outer layer,

TABLE 2

| Serial number | Battery energy density (Wh/cm³) | Battery rate capability 5C/0.2C (%) |
|---|---|---|
| Embodiment 1 | 2.40 | 98.3 |
| Embodiment 2 | 2.41 | 98.5 |
| Embodiment 3 | 2.39 | 98.7 |
| Embodiment 4 | 2.37 | 98.6 |
| Embodiment 5 | 2.03 | 97.7 |
| Embodiment 6 | 2.23 | 97.9 |
| Embodiment 7 | 2.32 | 90.6 |

TABLE 2-continued

| Serial number | Battery energy density (Wh/cm³) | Battery rate capability 5C/0.2C (%) |
|---|---|---|
| Embodiment 8 | 2.01 | 97.5 |
| Embodiment 9 | 1.83 | 98.6 |
| Contrast embodiment 1 | 1.42 | 81.2 |

Through the results in Table 1, it is observed that the nickel cobalt manganese hydroxide prepared by the method of the disclosure has a core and an outer layer covering the outside of the core. The core is flaky particles, the core porosity is 30-51%, the $D_{50}$ particle diameter of the flaky particles in the core is 5-8 the outer layer porosity is 52-60%, the $D_{50}$ particle diameter of particles in the outer layer is 0.1-5 and the specific surface area is 5.0-8.0 m²/g. The prepared nickel cobalt lithium manganate also has a core and an outer layer covering the outside of the core, the core is flaky particles, the core porosity is 8-15%, the $D_{50}$ particle diameter of the flaky particles in the core is 7-10 the outer layer porosity is 20-40%, the $D_{50}$ particle diameter of particles in the outer layer is 0.9-2.5 and the specific surface area is 0.5-1.5 m²/g. Therefore the energy density of the lithium ion battery prepared from the nickel cobalt lithium manganate of the disclosure is as high as 1.5-2.5 Wh/cm³, and the rate capability 5 C/0.2 C is as high as 90-99%. Specifically, a layer of loose and porous nickel cobalt manganese hydroxide particles is formed on the surface of the original compact nickel cobalt manganese hydroxide particles in a pulse current precipitation mode. The inside particles of the nickel cobalt manganese hydroxide prepared by the method are compact, the outside is loose and porous, the tap density is high, and the crystallinity degree is high. Further, the nickel cobalt lithium manganate finished product material prepared from the nickel cobalt manganese hydroxide also has a structure with the high-compactness inside and loose and porous outside, and has excellent crystallinity degree and conductivity. The battery prepared from the prepared nickel cobalt lithium manganate finished product material has high energy density and good rate capability.

The preferred embodiments of the present disclosure are described in detail above, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, the various embodiments of the present disclosure may be combined without departing from the idea of the present disclosure, and such combinations shall also fall within the scope of the present disclosure.

In the descriptions of this specification, descriptions using reference terms "an embodiment", "some embodiments", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

Although the embodiments of the present disclosure are shown and described above, it can be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. A nickel cobalt lithium manganate cathode material, comprising:
   a nickel cobalt lithium manganate,
   wherein the nickel cobalt lithium manganate in the nickel cobalt lithium manganate cathode material comprises:
   a core and an outer layer covering the outside of the core,
   wherein a porosity of the core is 8-15%, and a porosity of the outer layer is 20-40%.

2. The nickel cobalt lithium manganate cathode material according to claim 1, wherein:
   the core comprises flaky particles,
   a $D_{50}$ particle diameter of the flaky particles in the core is 5-10 μm, and
   a $D_{50}$ particle diameter of particles in the outer layer is 0.1-4.5 μm.

3. The nickel cobalt lithium manganate cathode material according to claim 2, wherein the $D_{50}$ particle diameter of the flaky particles in the core is 7-10 μm, and the $D_{50}$ particle diameter of particles in the outer layer is 0.9-2.5 μm.

4. The nickel cobalt lithium manganate cathode material according to claim 1, wherein a content of Ag in the cathode material is lower than 20 ppm.

5. The nickel cobalt lithium manganate cathode material according to claim 1, wherein a specific surface area of the cathode material is 0.1-10 m²/g.

6. The nickel cobalt lithium manganate cathode material according to claim 1, wherein a specific surface area of the cathode material is 0.5-1.5 m²/g.

7. The nickel cobalt lithium manganate cathode material according to claim 1, wherein a chemical formula of the nickel cobalt lithium manganate is $LiNi_xCo_yMn_{1-x-y}O_2$, wherein $0<x<1$, $0<y<1$, and $0<1-x-y<1$.

8. The nickel cobalt lithium manganate cathode material according to claim 2, wherein the particles of the outer layer are smaller than the flaky particles in the core, and the particles of the outer layer are attached onto surfaces of the flaky particles in the core with gaps such that the outer layer is porous.

9. A method for preparing the nickel cobalt lithium manganate cathode material according to claim 2, comprising the step of calcining a lithium source and a nickel cobalt manganese hydroxide,
   wherein the nickel cobalt manganese hydroxide comprises a core and an outer layer covering an outside of the core, and
   the core comprises flaky particles, a $D_{50}$ particle diameter of flaky particles in the core is 5-8 μm, and a $D_{50}$ particle diameter of particles in the outer layer is 0.1-5 μm.

10. The method according to claim 9, wherein a mol ratio of the element Li in the lithium source to the nickel cobalt manganese hydroxide is (1.0-1.1):1.

11. The method according to claim 9, wherein a mol ratio of the element Li in the lithium source to the nickel cobalt manganese hydroxide is (1.0-1.08):1.

12. The method according to claim 9, wherein a temperature of the calcination is 600-1100° C., and a time of the calcination is 8-20 h.

13. The method according to claim 9, wherein a temperature of the calcination is 750-950° C., and a time of the calcination is 10-15 h.

14. The method according to claim 9, wherein a chemical formula of the nickel cobalt manganese hydroxide is $Ni_xCo_yMn_{1-x-y}(OH)_2$, wherein $0<x<1$, $0<y<1$, and $0<1-x-y<1$.

15. The method according to claim 9, wherein a $D_{50}$ particle diameter of the flaky particles in the core is 5-7.5 μm, and a $D_{50}$ particle diameter of particles in the outer layer is 0.1-4.5 μm.

16. The method according to claim 9, wherein the nickel cobalt manganese hydroxide comprises Ag, a content of the Ag is lower than 20 ppm.

17. The method according to claim 9, wherein a specific surface area of the nickel cobalt manganese hydroxide is 0.1-10 $m^2/g$.

18. The method according to claim 9, wherein a specific surface area of the nickel cobalt manganese hydroxide is 5-8 $m^2/g$.

19. A lithium ion battery, comprising the nickel cobalt lithium manganate cathode material according to claim 1.

\* \* \* \* \*